United States Patent [19]

van Ghemen et al.

[11] Patent Number: 5,238,661
[45] Date of Patent: Aug. 24, 1993

[54] PROCESS FOR THE PREPARATION OF LOW-CHLORIDE AQUEOUS TITANYL NITRATE SOLUTIONS

[75] Inventors: Max-Emanuel van Ghemen, Darmstadt; Dieter Heinz, Sonderbach; Matthias Kuntz, Baiersdorf, all of Fed. Rep. of Germany

[73] Assignee: Merck Patent Gesellschaft mit Beschränkter Haftung, Darmstadt, Fed. Rep. of Germany

[21] Appl. No.: 862,476

[22] Filed: Apr. 2, 1992

[30] Foreign Application Priority Data

Apr. 3, 1991 [DE] Fed. Rep. of Germany ....... 4110685

[51] Int. Cl.$^5$ .................. C01G 23/00; C01B 21/48
[52] U.S. Cl. ................................ 423/81; 423/69; 423/399

[58] Field of Search .............. 423/69, 81, 598, 351, 423/395, 399

[56] References Cited

U.S. PATENT DOCUMENTS 4,061,583 12/1977 Murata et al. .................... 423/263
4,069,295 1/1978 Sugahara et al. ................... 423/81

FOREIGN PATENT DOCUMENTS 941293 7/1982 U.S.S.R. ........................... 423/399

*Primary Examiner*—David Brunsman
*Attorney, Agent, or Firm*—Millen, White, Zelano, & Branigan

[57] ABSTRACT

The application relates to a process for the preparation of low-chloride aqueous solutions of titanyl nitrate which have a chloride content of less than 200 ppm by treatment with nitric acid and excess nitric acid and/or hydrogen peroxide.

9 Claims, No Drawings

PROCESS FOR THE PREPARATION OF LOW-CHLORIDE AQUEOUS TITANYL NITRATE SOLUTIONS

The application relates to a process for the preparation of low-chloride aqueous solutions of titanyl nitrate (titanium oxynitrate, $TiO(NO_3)_2$) which have a chloride content of less than 200 ppm.

Soluble titanium compounds are of increasing interest in chemistry and the related industrial fields. For example, they can be employed as versatile reagents in chemical synthesis and analysis. Additionally of importance is the use of these compounds for the deposition of titanium dioxide in or from solutions, for example in the form of sols and gels, of finely divided powders, as thin coatings on any desired substrates, such as, for example, on glass for optical or decorative purposes or in the preparation of pearl luster pigments based on mica coated with $TiO_2$. In the high-performance ceramics sector, the element titanium plays a widespread and often essential role in functional ceramics, in particular in electro- and piezoceranics. Typical examples of these are ceramics based on barium titanate, which are employed as dielectrics and piezoelectrics. Starting materials for ceramics of this type are oxide or mixed oxide powders which are compressed to give molded articles or processed to give coatings and then sintered to give the ceramic. In this connection, the sinterability of the powder depends very substantially on the particle size, particle size distribution, particle shape and the material density of the oxide powder. In addition, the functional properties of the sintered ceramic are crucially affected by the homogeneity of distribution of the elements, the particle sizes and the particle size distribution. Mixed oxide powders which are prepared by classical processes by in some cases repeated mixing of the various components, sintering and grinding ("mixed oxide process"), no longer comply with the current requirements for high-performance ceramics. Advanced powder preparation techniques, in which the starting substances are present in dissolved form, however, ensure a substantial to complete homogeneity in the distribution of the main components and the dopants on the molecular/atomic level and enable the production of very finely divided, highly compactable and highly sinteractive powders. Appropriate "wet-chemical" processes for the production of mixed oxide powders work, for example, by the sol-gel process, by the coprecipitation process or by spray-drying or spray-roasting or solution combustion processes. Processes of the latter type are described, for example, in German Patent 3,840,316 and German Patent 3,916,643. The last-mentioned patent describes a particularly advantageous process in which metal nitrate solutions are converted into ceramic mixed oxide powders in a stoichiometrically controlled combustion process.

For the preparation of titanium-containing mixed oxide powders according to such processes, titanyl nitrate or aqueous titanyl nitrate solution would therefore be the titanium-providing components of choice.

Other soluble or liquid titanium compounds such as titanyl sulfate ($TiOSO_4$), titanium tetrachloride and titanyl chloride ($TiOCl_2$) are unsuitable as such, even for ceramic purposes. Organic titanium compounds, such as, for example, titanium orthoesters, are expensive. It is common to all these compounds that they are very unstable owing to their high sensitivity to hydrolysis and are problematic to handle.

The key substance for virtually all essential titanium compounds is titanium tetrachloride, which is prepared from titanium dioxide. The latter is in turn obtained from naturally occurring minerals.

Surprisingly, the relevant specialist literature offers no indication of any kind of a preparation of titanyl nitrate or its aqueous solution which is practicable and can possibly be carried out even on an industrial scale.

Theoretically, it should be possible to prepare titanyl nitrate from titanium tetrachloride or its partial hydrolysis product titanyl chloride in aqueous solution by reaction with nitric acid according to the equations $$TiCl_4 + 2\ HNO_3 + H_2O \rightarrow TiO(NO_3)_2 + 4\ HCl$$

$$TiOCl_2 + 2\ HNO_2 \rightarrow TiO(NO_3)_2 + 2\ HCl$$

In practice, however, conversions based on these reactions do not lead to the goal, as at least a partial hydrolysis, usually even during the reaction, occurs. Complete redissolution of titanium dioxide once precipitated or the $TiO_2$ hydrogels is virtually impossible. Independently of this, it is not possible to remove the hydrochloric acid formed in the reaction from the reaction solution. The attempt to drive this off, for example by heating or passing through inert gas, remains incomplete and likewise leads to $TiO_2$ precipitates. Precipitation as silver chloride, which is conceivable in principle, is itself impracticable for relatively low residual contents of chloride for economic reasons.

A content of chloride in high temperature solids reactions, like the sintering of ceramics, is extremely undesired. At high temperatures, metal chlorides are, as is known, exceedingly volatile. In addition, even very low amounts of chloride in ceramic materials for high-performance ceramics therefore have the effect that changes in composition occur during the sintering and, for example, the contents of dopants dramatically change. Especially in the preparation of barium titanates, there is the undesired effect that chloride ions are incorporated into the barium titanate lattice instead of oxygen ions.

The acceptable limit for a residual content of chloride which is still tolerable here can be regarded as about 200 ppm, relative to titanyl nitrate.

SUMMARY OF THE INVENTION

There was therefore the urgent need to find a process with which low-chloride aqueous solutions of titanyl nitrate which have a chloride content of less than 200 ppm can be prepared in a manner which is as simple as possible and also can be carried out on an industrial scale.

Surprisingly, it has now been found that by the reaction of titanium tetrachloride or titanyl chloride with nitric acid, low-chloride aqueous solutions of titanyl nitrate having a residual content of chloride of less than 200 ppm can be obtained without problems if titanium tetrachloride or titanyl nitrate is reacted with nitric acid in the presence of excess nitric acid and/or hydrogen peroxide, as a result of which the content of chloride is oxidized to chlorine.

The invention thus relates to a process for the preparation of low-chloride aqueous solutions of titanyl nitrate by reaction of titanium tetrachloride or titanyl chloride with nitric acid, which is characterizad in that the reaction is carried out in the presence of excess nitric acid and/or hydrogen peroxide, as a result of which the content of chloride is oxidized to chlorine and where a product having a residual chloride content of less than 200 ppm is obtained.

The basic principle of the process according to the invention is that the chloride present in the reaction solution in the form of hydrochloric acid as a result of the reaction of titanium tetrachloride or titanyl chloride with nitric acid is to be oxidized to chlorine by means of an oxidizing agent which is suitable and harmless for the later reuse of the product, which chlorine easily volatilizes from the reaction mixture as chlorine gas or can at least be easily driven off. A suitable oxidizing agent in this connection is nitric acid expediently employed in a stoichiometric excess or a stoichiometrically appropriate amount of hydrogen peroxide or the combination of nitric acid and hydrogen peroxide. Stoichiometrically appropriate amounts of these oxidizing agents are to be understood as meaning the amounts which are adequate to oxidize completely to chlorine the total amount of chloride prescribed by the amount of titanium compounds employed. An excess of oxidizing agent for safety, which may correspond to twice the amount in relation to the stoichiometrically necessary requirement, is uncritical in this connection.

According to the titanium compounds employed and the choice of oxidizing agents, the process according to the invention can be realized in the form of various variants which are based on the following reactions:

a) Titanium tetrachloride is reacted with nitric acid in the molar ratio 1:4 in accordance with the equation $$TiCl_4 + 4 HNO_3 \rightarrow TiO(NO_3)_2 + 2 Cl_2 + N_2O_3 + 2 H_2O$$

b) Titanium tetrachloride is reacted with nitric acid and hydrogen peroxide in the molar ratio 1:2:2 in accordance with the equation $$TiCl_4 + 2 HNO_3 + 2 H_2O_2 \rightarrow TiO(NO_3)_2 + 2 Cl_2 + 3 H_2O$$

c) Titanyl chloride is reacted with nitric acid in the molar ratio 1:3 in accordance with the equation $$2 TiOCl_2 + 6 HNO_3 \rightarrow 2 TiO(NO_3)_2 + 2 Cl_2 + N_2O_3 + 3 H_2O$$

d) Titanyl chloride is reacted with nitric acid and hydrogen peroxide in the molar ratio 1:2:1 in accordance with the equation $$TiOCl_2 + 2 HNO_3 + H_2O_2 \rightarrow TiO(NO_3)_2 + Cl_2 + 2 H_2O$$

In the case of these variants too, it is true that nitric acid and/or hydrogen peroxide can also be employed in excess in relation to the stoichiometric requirement.

Titanium tetrachloride and titanyl chloride are equally suitable starting substances. The liquid titanium tetrachloride is expediently employed in pure form. Owing to the sensitivity to hydrolysis of titanium tetrachloride and its correspondingly problematical handleability, the precautions known per se for this compound are to be taken. Titanyl chloride, which can expediently be employed in the form of aqueous solution in the process according to the invention, is essentially nonproblematical to handle and therefore preferred. It is particularly expedient to employ titanyl nitrate in the form of an approximately 60% by weight aqueous solution.

The nitric acid necessary for the reaction expediently has a content of 60–100% by weight. Preferably, fuming nitric acid (having a content of about 100% by weight) is employed.

If it is intended to make use of hydrogen peroxide as an additional oxidizing agent, hydrogen peroxide having a content of 20 to 70% by weight is expediently employed. The hydrogen peroxide employed preferably has a content of 30% by weight.

In a particularly preferred embodiment of the process according to the invention, an approximately 60% by weight aqueous solution of titanyl chloride is reacted with fuming nitric acid and 30% by weight hydrogen peroxide, an aqueous solution of titanyl nitrate being obtained which converted has a content of approximately 15% by weight of titanium dioxide. A titanyl nitrate solution of this concentration is particularly suitable for the preparation of oxide or mixed oxide powders for ceramic purposes according to spray-pyrolytic processes such as, for example, according to German Patent 3,916,643.

The process according to the invention for the preparation of low-chloride aqueous titanyl nitrate solutions can be carried out in an extremely simple manner and without a relatively large outlay in terms of apparatus. The process can also be carried out without problems even on the technical and production scale. In these cases, known and customary equipment and techniques can be used. In principle, reaction vessels of suitable volume made of inert material, such as, for example, glass or enamel-coated metal, are suitable. The reaction vessels can expediently be provided with inlet and outlet devices, equipment for leading off the reaction gases and with stirring or mixing equipment.

From the course of the process, it is sufficient to bring together and to mix the appropriate reactants in the molar amounts necessary in each case. The reaction in this case takes place immediately and quantitatively, chlorine gas and nitrous gases being evolved which can be led off and neutralized using customary agents and techniques. As the reaction is exothermic, it is expedient to keep the reaction temperature at 40° C. or below by regulation of the rate of addition of the reactants and/or by cooling. Residues of the gases formed in the reaction can be driven off from the reaction solution by intensive stirring, slight warming or, particularly expediently, by passing through nitrogen gas.

It is particularly surprising that the process according to the invention is very uncritical in respect of possible $TiO_2$, precipitates, in particular if the reaction temperature is not allowed to rise above 40° C.

The reaction time is essentially dependent on the batch amount and can be typically stated for a 50 l batch as 12–24 hours. The end of the reaction is very easy to detect in that on addition of (further) hydrogen peroxide the characteristic intensive red color of the titanyl peroxide ion appears and lasts for a relatively long time, typically about 3 hours. This indicates that chloride is no longer present for oxidation to chlorine so that titanyl peroxide can be formed with unused hydrogen peroxide. If the titanyl peroxide coloration remains stable over a relatively long period, the residual content of chloride in the reaction solution is in each case less than 200 ppm, relative to the content of titanyl nitrate. As a rule, a residual content of 100–10 ppm or even less is achieved. The chloride content can be determined qualitatively and quantitatively using customary analytical methods, such as, for example, by potentiometric titration with silver nitrate.

The titanyl nitrate solution obtained can be supplied immediately as it is to its particular further application and, in this form, owing to its residual content of chloride of less than 200 ppm, in particular of less than 100 ppm, is particularly suitable for the preparation of ceramic oxide or mixed oxide powders by spray-pyrolysis.

Of course, the titanyl nitrate solutions obtainable by the process according to the invention can also be concentrated or diluted with customary agents.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application German P 41 10 685.7, filed Apr. 3, 1991, are hereby incorporated by reference.

EXAMPLE

The apparatus used is a glass reaction vessel of 80 l capacity which has a gas inlet valve at the bottom and an inlet for liquids and an outlet for sucking off the reaction gases at the top.

By means of slight underpressure, 43.5 kg (27.7 l) of 60% by weight aqueous titanyl chloride solution are drawn into the reaction vessel. Nitrogen gas is then blown in at slight overpressure through the bottom valve during the further course of the process, in order by this means to provide for thorough mixing of the reaction liquids and rapid removal of the resulting reaction gases. In the course of 6 hours, 34 kg (25 l) of fuming nitric acid are introduced via the inlet at the top. In the course of a further 6 hours, 9.4 kg (8.5 l) of 30% by weight hydrogen peroxide are metered in in portions in such a way that the temperature does not exceed 40° C. The chlorine and nitrous gases formed in this process are continuously sucked off with the nitrogen. The mixture is then allowed to react for a further 12 hours. A persistent red coloration of the solution indicates the end of the reaction. An aqueous solution of titanyl nitrate having a converted content of 5% by weight of titanium dioxide and a residual content of chloride of 100 ppm is obtained.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the preparation of low-chloride aqueous solutions of titanyl nitrate by the reaction of titanium tetrachloride or titanyl chloride with nitric acid, the improvement comprising conducting the reaction in the presence of an excess amount of nitric acid and/or hydrogen peroxide effective to oxidize the content of chloride to chlorine to provide a product having a residual chloride content of less than 200 ppm.

2. A process according to claim 1, wherein the reaction is carried out using a nitric acid having a nitric acid concentration of 60–100% by weight.

3. A process according to claim 1, wherein the reaction is carried out using a hydrogen peroxide having a hydrogen peroxide content of 20–70% by weight.

4. A process according to claim 1, wherein an approximately 60% by weight aqueous solution of titanyl chloride is reacted with fuming nitric acid and 30% by weight hydrogen peroxide.

5. A process according to claim 1, wherein the amount of excess nitric acid or hydrogen peroxide is at least a stoichiometric amount relative to the amount of chloride found in said reaction with nitric acid.

6. A process according to claim 1, wherein the product has a residual chlorine content of less than 100 ppm.

7. A process according to claim 1, wherein the reaction is conducted at temperatures not to exceed 40° C.

8. A process according to claim 1, wherein a solution of about 60% titanyl chloride is reacted with fuming nitric acid and a 30% by weight hydrogen peroxide.

9. The low-chloride aqueous solution of titanyl nitrate prepared by the reaction of titanium tetrachloride or titanyl chloride with nitric acid, the improvement comprising conducting the reaction in the presence of an excess amount of nitric acid and/or hydrogen peroxide effective to oxidize the content of chloride to chlorine to provide a product having a residual chloride content of less than 220 ppm.

* * * * *